United States Patent
Cattani et al.

(10) Patent No.: US 9,915,197 B2
(45) Date of Patent: Mar. 13, 2018

(54) CONTROL METHOD FOR VARIABLE GEOMETRY EXHAUST TURBINE

(75) Inventors: Luis C. Cattani, Aurora, IL (US); Michael Uchanski, Chicago, IL (US); Rogelio Rodriguez, Plainfield, IL (US); James R. Cigler, Lockport, IL (US); Jeremy G. Schipper, Jeremy G. Schipper, IL (US); Jer Sheng Chen, Naperville, IL (US); Dileep Khadilkar, Naperville, IL (US); Shree C. Kanchanavally, Naperville, IL (US); John R. Zagone, Westmont, IL (US); Daniel Cornelius, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 393 days.

(21) Appl. No.: 14/410,836

(22) PCT Filed: Jun. 26, 2012

(86) PCT No.: PCT/US2012/044154
§ 371 (c)(1),
(2), (4) Date: Dec. 23, 2014

(87) PCT Pub. No.: WO2014/003716
PCT Pub. Date: Jan. 3, 2014

(65) Prior Publication Data
US 2015/0337720 A1    Nov. 26, 2015

(51) Int. Cl.
F02B 37/24    (2006.01)
F02D 41/10    (2006.01)
(Continued)

(52) U.S. Cl.
CPC .......... F02B 37/24 (2013.01); F02D 41/0007 (2013.01); F02D 41/10 (2013.01);
(Continued)

(58) Field of Classification Search
CPC .......... F02B 37/24; F02B 33/44; F02B 47/08; F02M 26/05; F02M 26/04; F02M 25/07;
(Continued)

(56) References Cited

U.S. PATENT DOCUMENTS 6,035,640 A * 3/2000 Kolmanovsky ......... F02B 37/24
123/676
6,067,800 A * 5/2000 Kolmanovsky ......... F02B 37/24
60/602
(Continued)

*Primary Examiner* — Patrick Maines
(74) *Attorney, Agent, or Firm* — Jack D. Nimz; Jeffrey P. Calfa

(57) ABSTRACT

A method of setting actuator position of a variable geometry turbine linked to drive a compressor for a compression ignition engine using exhaust gas recirculation. The method includes detecting an engine transient event; determining current mass air flow through the compressor and exhaust temperature; resetting variable geometry turbine position to maximize mass air flow through the compressor; adding the maximum allowable quantity of fuel; determining exhaust temperature increase; adjusting exhaust pressure to allow an increase in mass air flow and exhaust temperature; and returning to the resetting step until a limit is reached.

3 Claims, 2 Drawing Sheets

(51) Int. Cl.
  *F02D 41/14* (2006.01)
  *F02D 41/18* (2006.01)
  *F02D 41/00* (2006.01)
  *F02M 26/04* (2016.01)
  *F02M 26/05* (2016.01)

(52) U.S. Cl.
  CPC ..... *F02D 41/1446* (2013.01); *F02D 41/1448* (2013.01); *F02D 41/18* (2013.01); *F02M 26/04* (2016.02); *F02M 26/05* (2016.02); *F02D 2200/602* (2013.01); *F02D 2250/34* (2013.01); *Y02T 10/144* (2013.01)

(58) Field of Classification Search
  CPC ............. F02D 41/1446; F02D 41/1448; F02D 41/0007; F02D 41/18; F02D 41/10; F02D 2250/34; F02D 2200/602; Y02T 10/144
  USPC .................................................. 60/608, 605.2
  See application file for complete search history.

(56) References Cited

U.S. PATENT DOCUMENTS

| | | | |
|---|---|---|---|
| 6,672,060 B1* | 1/2004 | Buckland | F02D 23/005 123/564 |
| 7,415,825 B2 | 8/2008 | Lyons | |
| 2003/0004677 A1* | 1/2003 | Olin | F02D 41/0235 702/140 |
| 2003/0010019 A1* | 1/2003 | Engel | F02B 37/24 60/285 |
| 2006/0225418 A1* | 10/2006 | Kishimoto | F02B 37/22 60/605.1 |
| 2006/0277908 A1* | 12/2006 | Rouphael | F02D 35/025 60/605.1 |
| 2008/0245070 A1* | 10/2008 | Allain | F02D 23/02 60/605.2 |
| 2013/0074496 A1* | 3/2013 | Chi | F02B 37/04 60/605.2 |
| 2013/0152583 A1* | 6/2013 | Uesugi | F01D 17/165 60/608 |
| 2014/0196704 A1* | 7/2014 | Shutty | F02B 37/18 123/676 |
| 2016/0131089 A1* | 5/2016 | Lahti | F02D 41/0007 60/605.2 |

* cited by examiner

MAP = Intake Manifold Pressure
Enthalpy = Enthalpy at the inlet of the turbine (Temperature)
EXMPtarget = Exhaust manifold pressure setpoints
EXMPmeasured = Measured exhaust manifold pressure setpoint
ERR = Error between target and measured exhaust manifold pressure
VGTpos = Vane position of the variable geometry turbine

CONTROL METHOD FOR VARIABLE GEOMETRY EXHAUST TURBINE

BACKGROUND

Technical Field:

The technical field relates generally to turbo-charged compression ignition engines having exhaust gas recirculation and, more particularly, to methods of controlling a variable geometry exhaust turbine in the turbo-charger sub-system.

Description of the Technical Field:

Exhaust turbines have long been used to recover energy from high pressure exhaust gas produced by most internal combustion engines. One use of the recovered energy is to drive a compressor/supercharger on the intake side of the engine and thereby increase the mass of the air charge delivered to engine combustion chambers. This is referred to as turbo-supercharging, or more commonly just turbo-charging. The use of turbo-charging to increase the mass of air delivered to the engine allows more fuel to be burned per combustion stroke thereby increasing the work done with each combustion stroke. The system is a self reinforcing loop as the engine serves as the pump which drives the exhaust turbine.

Variable geometry turbines (VGT) are used with turbo-charged engines to reduce engine pumping losses. U.S. Pat. No. 6,067,800 describes use of a VGT for improving torque response, fuel economy and emission levels.

Exhaust gas recirculation (EGR) is commonly employed on compression ignition engines to reduce nitrous oxide emissions. An EGR valve connects the exhaust manifold of an engine to its intake manifold. Exhaust gas displaces fresh air in the combustion cylinders and functions as an inert gas in the cylinder reducing cylinder temperature during combustion and thus reducing the formation of nitrous oxides. The concurrent use of EGR and turbo-charging with an engine complicates control over the engine. In a typical engine control system where both turbo-charging and EGR are present, a VGT has been used to control mass airflow (MAF) in the intake manifold and the EGR valve has been used to control emissions.

SUMMARY

A method of setting actuator position of a variable geometry turbine linked to drive a compressor that drives air into an intake manifold for a compression ignition engine is described. The method allows for exhaust gas recirculation from an exhaust manifold to the intake manifold. The method comprises the steps of: detecting an engine transient event from steady state conditions; determining current mass air flow through the compressor and exhaust temperature; resetting variable geometry turbine position to maximize mass air flow through the compressor and minimize pumping losses across the engine; adding the maximum allowable quantity of fuel; determining exhaust temperature increase; adjusting exhaust pressure to allow an increase in mass air flow and exhaust temperature; and returning to the resetting step until a limit is reached.

DETAILED DESCRIPTION

Figure 1:
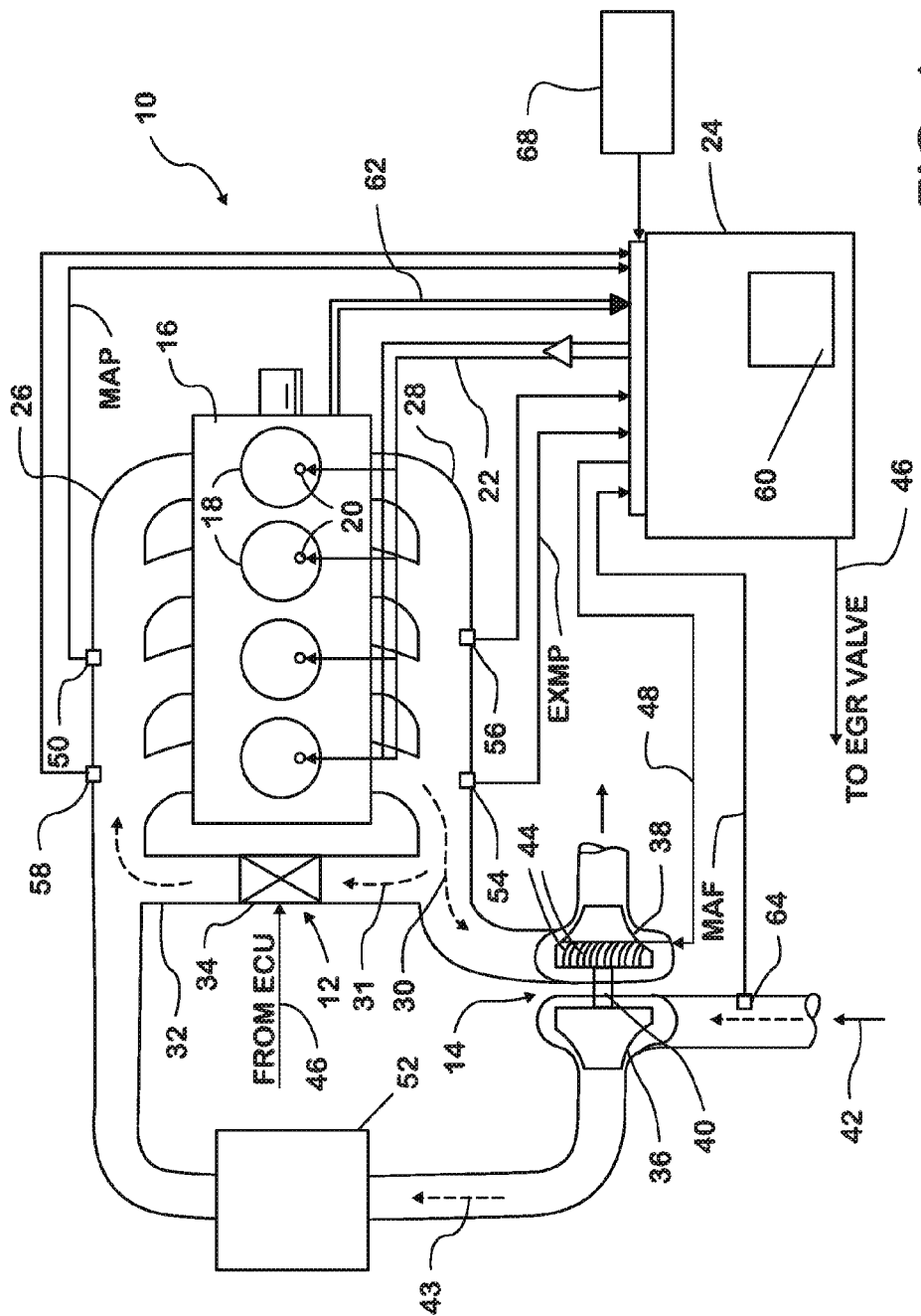
FIG. 1 is a schematic view of a compression engine system having exhaust gas recirculation and a turbo-charging sub-system incorporating a variable geometry turbine.

In the following detailed description, like reference numerals and characters may be used to designate identical, corresponding, or similar components in differing drawing figures.

Referring now to the figures, and in particular to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26 and combustion gases are exhausted through the exhaust manifold 28 in the direction of arrow 30.

To reduce the level of NOx emissions, the engine is equipped with an EGR sub-system 12. The EGR sub-system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. The recirculated exhaust gas acts as an inert gas in the combustion chambers 18. This lowers the flame and in-cylinder gas temperature with a consequential reduction in the formation of NOx compounds. The recirculated exhaust gas also displaces fresh air and reduces the air-to-fuel ratio of the in-cylinder mixture. During operation of engine system 10 the exhaust manifold back pressure (EXMP) in the exhaust manifold 28 is kept high enough to drive exhaust gas through EGR valve 34 into the intake manifold 26.

The turbocharger 14 recovers exhaust gas energy to increase the mass of the air charge delivered to the engine combustion chambers 18. The exhaust gas flowing in the direction of arrow 30 drives the turbo-charger 14. This larger mass of air can be burned with a larger quantity of fuel, resulting in more torque and power as compared to naturally aspirated, non-turbocharged engines.

The turbo-charger 14 includes a compressor/supercharger 36 and an exhaust turbine 38 coupled to one another by a common shaft 40. Exhaust gas 30 drives the exhaust turbine 38 which, in turn, drives the compressor 36 which, in turn, compresses ambient air 42 and directs it (arrow 43) into an intercooler 52. Intercooler 52 extracts heat from the compressed ambient air thereby increasing its density and reducing pressure at the outlet from the compressor 36. Air is discharged from the intercooler 52 into the intake manifold 26. The VGT 14 can be configured during engine operation to vary the turbine flow area and the angle at which the exhaust gas 30 is directed at the turbine 38 blades. This is accomplished by changing the angle of the inlet guide vanes 44 on the turbine 38.

Operation of all of the engine sub-systems, including the EGR 12, VGT 14 and fuel injectors 20 are controlled by the ECU 24. For example, signals on signal line 46 from the ECU 24 regulates the EGR valve 44 position, and a signal on signal line 48 regulates the position of the VGT guide vanes 44.

Commands on signal lines 46, 48 are calculated from measured engine operating variables and operator inputs by means of a control algorithm. Sensors provide the ECU 24 with engine operating information. For example, an intake manifold pressure (MAP) sensor 50 provides a signal to the ECU 24 indicative of the pressure in the intake manifold 26. Likewise, exhaust manifold pressure (EXMP) sensor 54 provides a signal to the ECU 24 indicative of the pressure in the exhaust manifold 28. An intake manifold temperature sensor 58 provides a signal to the ECU 24 indicative of the intake air temperature. A mass airflow (MAF) sensor 64 also provides a signal indicative of the compressor mass airflow to the ECU 24. Additional sensory inputs are also received by the ECU 24 along signal line 62 such as engine coolant temperature, engine speed, and EGR valve position. Operator inputs 68 applied to the ECU 24 include accelerator pedal position or other fueling request inputs.

The engine control methods described herein apply to all turbocharged compression ignition engines equipped with EGR systems, regardless of the type of fuel used. While operation is described with reference to a diesel engine, the methods are also applicable to other compression ignition engines as well.

More detailed consideration of ECU 24 management of the engine system 10 is now given. ECU 24 provides control signal levels for opening, closing and progressively restricting or freeing gas flow through EGR valve 34. ECU 24 provides a control signal for positioning vanes 44 on the VGT 14 inlet stator. Values for the position signals for the EGR valve 24 and the VGT 28 vanes are calculated with reference to the instantaneous load on engine 16. Data which relate to engine load under steady state conditions include fuel flow, which is calculated by ECU 24, operator inputs 68 such as accelerator pedal position, vehicle speed and engine speed (rpm) data. These data have conventionally been used to interrogate a look up table (LUT) 60 for values for the EGR valve 34 and VGT 14 vane 44 position signals which are selected to deliver EXMP setpoints and optimized Brake Specific Fuel Consumption (BSFC).

In contrast to steady state conditions, placing engine 22 under transient operating conditions, particularly transient conditions involving an increase in power demanded, the practice has been to position VGT 14 vanes 44 to maximize EXMP thereby increasing pressure ratio across the turbine 38 to deliver more power to the compressor 36. Increased EXMP also increases engine system 10 pumping losses. If VGT 14 movement makes the turbine 28 operate in an inefficient region, a decline in MAF can result. Falling MAF results in low fuel flow and lower torque. Available power for acceleration from engine system 10 can decline markedly.

EXMP may be controlled during engine system 10 transient conditions to increase MAF while still minimizing engine pumping losses. As a starting point it may be initially assumed that mass flow rate through the EGR valve 34 is constant and a VGT 14 vane 44 position may be chosen that will maximize engine 16 work over a given time period. Available work is maximized by burning as much fuel as possible with each combustion stroke. If more fuel is burned at a constant emission level with a given mass flow rate through the EGR valve 34, VGT 14 vane 44 position is chosen to maximize MAF transported through the engine block 16 each combustion cycle. Sensors to supply for some variables, such as enthalpy of the exhaust, are provided including: an intake manifold pressure sensor 50 ("MAP"); an exhaust manifold pressure sensor 54 (EXMP or Pin); and an exhaust manifold temperature sensor 56 (Tin).

The following equation gives turbine power, Power(turb):

$$\text{Power(turb)} = mdot * Cp * Tin * eta * (1 - (Pout/Pin)^{\wedge}(\text{gamma} - 1/\text{gamma})) \quad \text{(Eq. 1)}$$

where,
mdot=mass flow through the turbine
Cp=heat capacity at constant pressure
Tin=exhaust manifold temperature (temperature at the turbine inlet)
Pout=Turbine outlet pressure
Pin=Exhaust manifold pressure (pressure at turbine inlet)
Gamma=Ration of specific heats
Eta=Total or static efficiency of the turbine Mass storage in the engine block 16 combustion chambers 18 is disregarded. The equation shows how turbine work can be maximized when MAF is large and when exhaust temperature is large. Accommodating mass storage in the engine block 16 should not change the basic result.

Assuming turbine 38 recovered energy equals compressor 36 work, maximum compressor work is proportional to faster spinning of the compressor which in turn leads to faster air flow rate. However, current MAF and exhaust temperature are the result of past operation of engine system 10. VGT 14 vane 44 position is chosen so that exhaust manifold pressure allows:

Turbine power to be maximized given the current state of MAF, Tin
(a) so that MAF is as large as possible a short time in the future;
(b) allowing more fuel to be added to that MAF;
(c) producing an increase in exhaust temperature due to higher fuel burning;
(d) which allows Pin to be adjusted so that MAF and Tin are increased and the process continues.

MAF, Cp, Tin fall out of the optimization and act as inputs to the optimization process. The problem simplifies to one of choosing Pin for a given MAF and Tin at each time Eq. 1 is maximized. The quantity has an effective maximum since the value within the parenthesis in Eq. 1 increases monotonically with Pin to a limit.

Power output has an upper limit because the value in brackets in Eq. 1 increases monotonically with Pin and asymptotically converges to 1. The efficiency of the turbine which is a function of pressure ratio, MAF and Tin reaches a maximum and then decreases. This multiplied by the term in brackets should give a single global maximum that applies until the MAF or turbine speed change sufficiently. For a given MAF through the turbine and exhaust temperature there should exist a Pin where turbine operates more efficiently delivering higher power. In other words, VGT 14 inlet guide vane 44 position can be changed from its prior steady state location upon entry to transient conditions to increase efficiency where there is power demand.

Though the turbine could operate efficiently with higher pressure ratio across it, this does not imply that engine brake torque is high. With a high EXMP and lower intake manifold 26 air pressure (MAP) there exists a point where increasing engine system 10 pumping losses negates all the excess air that is generated by operating the turbine efficiently. All of the energy obtained by burning the fuel with the excess air is lost compensating the pumping loss across the engine. With Pin closing on MAP, EGR transport from the exhaust manifold to the intake manifold declines and as a result higher torque is obtained at the cost of increasing NOX. The EXMP set point should be selected to provide minimum EGR driving capability and at the same time lower pumping losses. Pumping is typically a function of EXMP and MAP.

Hence during the process of selecting exhaust back pressure, current MAP should be taken into consideration to minimize pumping losses.

Figure 2:
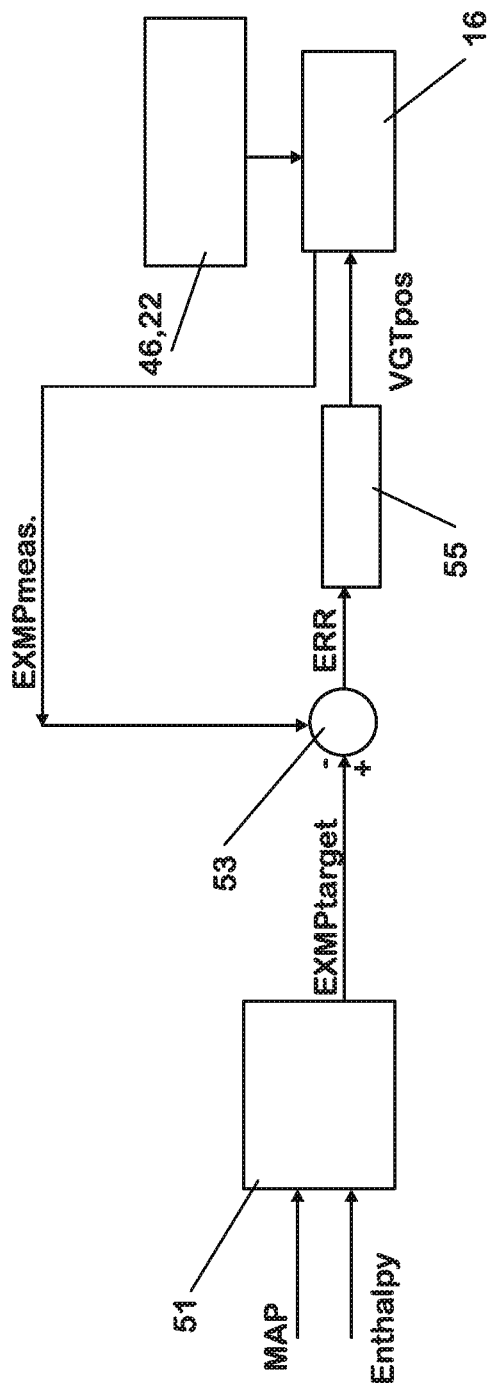
FIG. 2 is a feedback control diagram for obtaining variable geometry turbine position.

The strategy is to take the product of MAF and exhaust temperature (which is the enthalpy) as one of the input and intake manifold pressure as the other input for determining a optimal EXMP that minimizes pumping losses and maximizes MAF. Referring to FIG. 2, with a change in engine load, produced by changes in EGR and fuel injection control signals 46, 22, current MAP and enthalpy are used to select an EXMP setpoint, here referred to as the EXMPtarget (module 51). Measured EXMP is then subtracted (module 53) from EXMPtarget to obtain an error value (ERR) which is applied to a proportional-integral-derivative control module 55 to generate an adjustment in VGT 14 vane 44 position by varying its input control signal (VGTpos). VGTpos is applied to the compression engine system 10, or more precisely, an actuator associated with VGT 14.

What is claimed is:

1. A method of setting flow through variable geometry turbine linked to drive a compressor into an intake manifold for a compression ignition engine, the method comprising the steps of:

a) detecting engine operational transient events demanding increased power output;
   b) from current mass air flow through the compressor, exhaust temperature and intake manifold pressure, selecting a predetermined exhaust back pressure target setpoint to maximize mass air flow and minimize pumping loss;
   c) obtaining current exhaust back pressure;
   d) determining the difference between current exhaust back pressure and the exhaust back pressure target setpoint;
   e) varying flow through the variable geometry turbine to eliminate the difference;
   f) increasing fuel flow to a maximum allowable rate; and
   g) returning to step b) until the engine steady state operating conditions exist or a predetermined limit condition is met.

2. The method of claim 1 wherein step e) is modified to limit variation to maintain a minimum level of exhaust gas recirculation.

3. The method of claim 2 wherein step e) includes adjusting vane position in the variable geometry turbine.

* * * * *